United States Patent
Simonsen et al.

(10) Patent No.: US 9,542,215 B2
(45) Date of Patent: Jan. 10, 2017

(54) MIGRATING VIRTUAL MACHINES FROM A SOURCE PHYSICAL SUPPORT ENVIRONMENT TO A TARGET PHYSICAL SUPPORT ENVIRONMENT USING MASTER IMAGE AND USER DELTA COLLECTIONS

(75) Inventors: Harold C. Simonsen, Salt Lake City, UT (US); Ashton R. Snelgrove, Salt Lake City, UT (US); Thomas S. McCullagh, Orem, UT (US); David E. Youngberg, Sandy, UT (US)

(73) Assignee: V3 SYSTEMS, INC., Salt Lake City, UT (US)

( * ) Notice: Subject to any disclaimer, the term of this patent is extended or adjusted under 35 U.S.C. 154(b) by 151 days.

(21) Appl. No.: 13/250,836

(22) Filed: Sep. 30, 2011

(65) Prior Publication Data
US 2013/0086580 A1    Apr. 4, 2013

(51) Int. Cl.
*G06F 9/455* (2006.01)
*G06F 12/16* (2006.01)
(Continued)

(52) U.S. Cl.
CPC ....... *G06F 9/45558* (2013.01); *G06F 11/1407* (2013.01); *G06F 12/16* (2013.01); *G06F 9/45533* (2013.01); *G06F 9/4856* (2013.01); *G06F 9/5077* (2013.01); *G06F 11/1448* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| 7,203,944 B1 * | 4/2007 | van Rietschote et al. ..... 718/104 |
| 8,065,676 B1 * | 11/2011 | Sahai et al. ...................... 718/1 |

(Continued)

FOREIGN PATENT DOCUMENTS

WO    WO 2006/044701    4/2006

OTHER PUBLICATIONS

Hirofuchi et al, A Live Storage Migration Mechanism over WAN for Relocatable Virtual Machine Services on Clouds, 2009, 9th IEEE/ACM International Symposium on Cluster Computing and the Grid, pp. 460-465.*

(Continued)

*Primary Examiner* — Abu Ghaffari
(74) *Attorney, Agent, or Firm* — Miller, Matthias & Hull LLP

(57) ABSTRACT

Migration of a pool of virtual machines to a target physical machine. The virtual machines were all provisioned into an initial state using a master image. Thereafter, changes to the state were reflected in corresponding user delta collections for each of the virtual machines. In preparation for the migration to the target physical machine, a pool is allocated on the target machine. The target pool is associated with the same master image as the source pool. The virtual machines are provisioned within the target pool based on the master image. The virtual machines in the target pool are then connected to the corresponding user delta collection, allowing the virtual machines to continue in the same state in the target machine as when they operated in while last operating in the source machine. The target machine may be as master service provider.

21 Claims, 12 Drawing Sheets

(51) Int. Cl.
*G06F 11/14* (2006.01)
*G06F 9/50* (2006.01)
*G06F 9/48* (2006.01)

(56) References Cited

U.S. PATENT DOCUMENTS

| | | | |
|---|---|---|---|
| 8,191,063 B2* | 5/2012 | Shingai et al. | 718/1 |
| 8,255,650 B1* | 8/2012 | Gruttadauria | G06F 9/45558 711/162 |
| 8,429,449 B2* | 4/2013 | Biran et al. | 714/10 |
| 8,443,367 B1* | 5/2013 | Taylor et al. | 718/1 |
| 8,468,535 B1* | 6/2013 | Keagy et al. | 718/104 |
| 2005/0262512 A1* | 11/2005 | Schmidt | G06F 9/465 719/310 |
| 2007/0208918 A1* | 9/2007 | Harbin | G06F 11/1451 711/162 |
| 2008/0146178 A1* | 6/2008 | Lu | H04B 1/0014 455/187.1 |
| 2008/0184225 A1* | 7/2008 | Fitzgerald et al. | 718/1 |
| 2008/0222375 A1* | 9/2008 | Kotsovinos | G06F 9/5083 711/162 |
| 2009/0216975 A1* | 8/2009 | Halperin | G06F 9/45537 711/162 |
| 2010/0082922 A1* | 4/2010 | George | G06F 9/461 711/162 |
| 2010/0161922 A1* | 6/2010 | Sharp | G06F 9/45558 711/162 |
| 2010/0299368 A1* | 11/2010 | Hutchins | G06F 17/30115 707/803 |
| 2011/0185355 A1* | 7/2011 | Chawla et al. | 718/1 |
| 2011/0289205 A1* | 11/2011 | Hansson et al. | 709/224 |
| 2012/0179855 A1* | 7/2012 | Tsirkin | G06F 9/45558 711/6 |
| 2012/0290630 A1* | 11/2012 | Aizman | G06F 17/30233 707/827 |
| 2013/0054530 A1* | 2/2013 | Baker | G06F 17/30079 707/639 |
| 2013/0067471 A1* | 3/2013 | Kruglick | G06F 9/45558 718/1 |

OTHER PUBLICATIONS

Bose et al, Optimizing Live Migration of Virtual Machines Across Wide Area Networks Using Integrated Replication and Scheduling, IEEE International Systems Conference (SysCon) 2011, pp. 1-6.*
Hasel et al, Efficient Storage Synchronization for Live Migration in Cloud Infrastructures, 2011 19th International Euromicro Conference on Parallel, Distributed and Network-Based Processing, pp. 511-518.*
Sapuntzakis et al, Optimizing the Migration of Virtual Computers, 2002, USENIX, 5th Symposium on Operating Systems Design and Implementation, pp. 377-390.*
Krsul I et al: "VMPlants: Providing and Managing Virtual Machine Execution Environments for Grid Computing", Supercomputing, 2004. Proceedings of the ACM/IEEE SC2004 Conference Pittsburgh PA, USA Nov. 6-12, 2004, Piscataway NJ, USA, IEE, Nov. 6, 2004, pp. 7-7, XP010780332, DOI: 10.1109/SC.2004.67 ISBN: 978-0/7695-2153-4 the whole document.

* cited by examiner

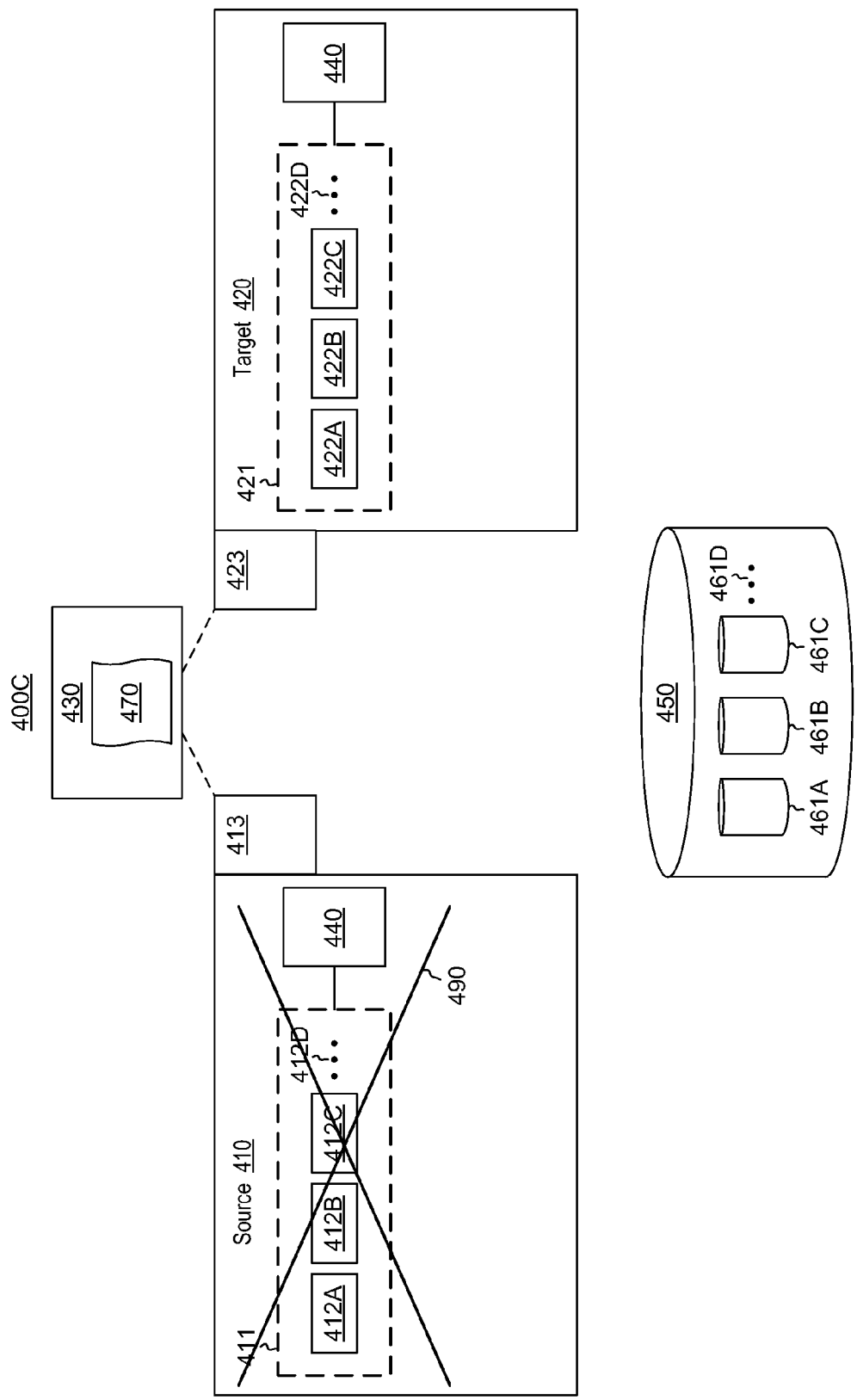

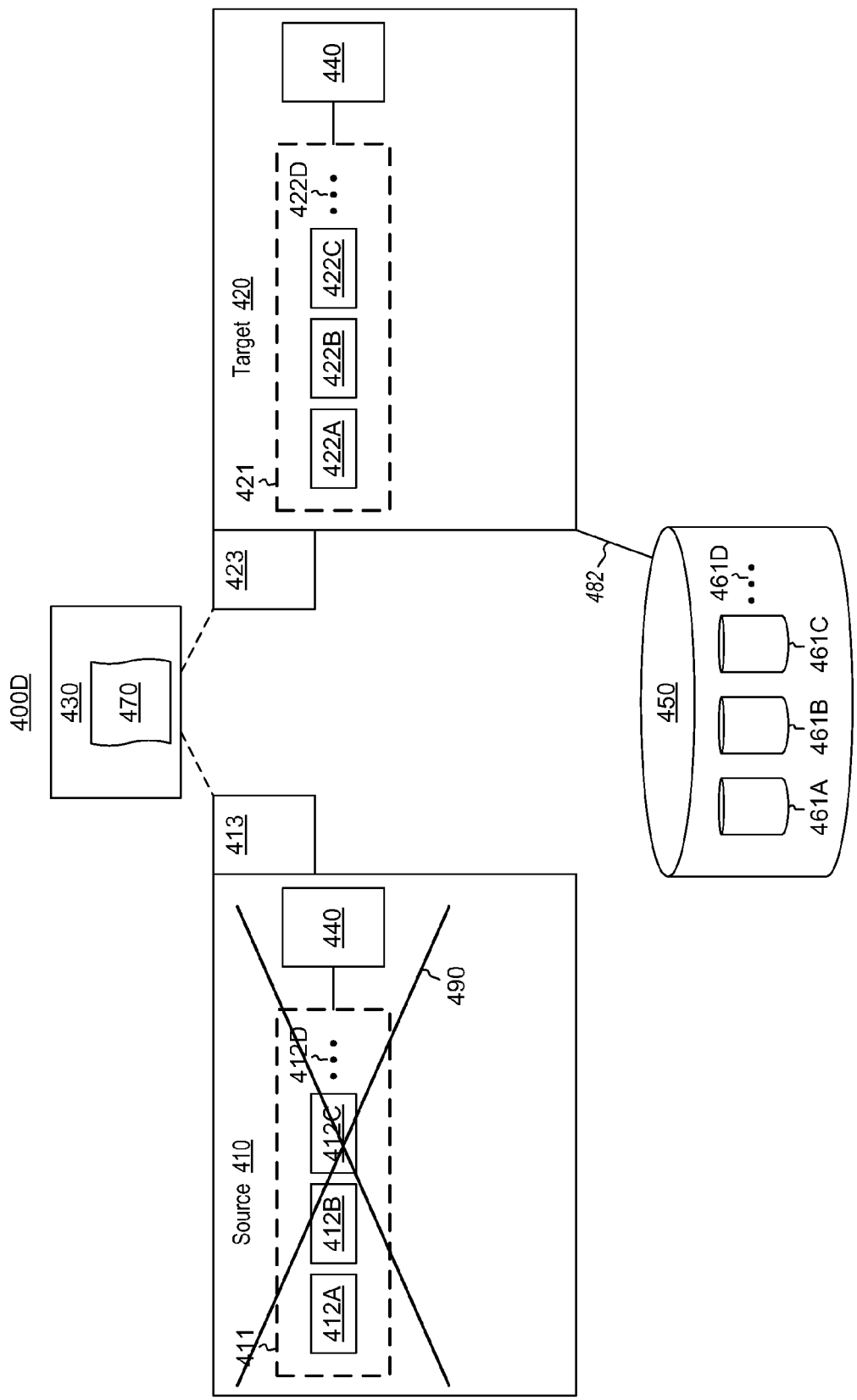

1000
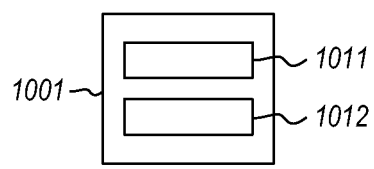
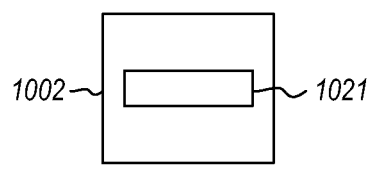
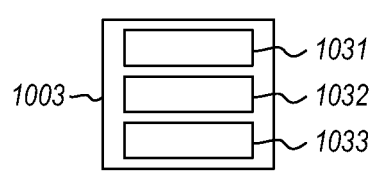
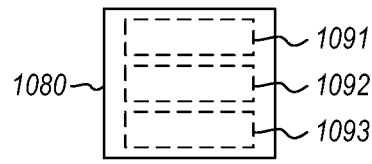
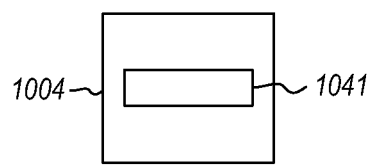
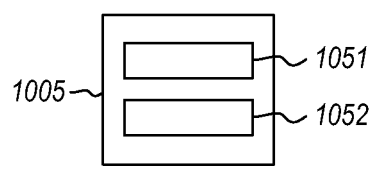
*Figure 10*

MIGRATING VIRTUAL MACHINES FROM A SOURCE PHYSICAL SUPPORT ENVIRONMENT TO A TARGET PHYSICAL SUPPORT ENVIRONMENT USING MASTER IMAGE AND USER DELTA COLLECTIONS

BACKGROUND

For more than 40 years, technologists have known that one way to lower computing costs is to simultaneously share resources across multiple components and/or machines. This concept eventually led to the so-called file/server networking model where multiple desktop computers were linked together to a server where files and printer resources could be shared. Given the success achieved in improved performance and lowered costs through virtual servers, companies have been diligently attempting to replicate their efforts with "virtual desktops", which will now be explained.

As a user interfaces with a client computing system (hereinafter referred to as a "client"), the user is presented with a desktop environment. The desktop environment may include an intuitive visualization of various icons, windows, and other tools that user may interact with to manipulate the various applications and environments offered by the desktop environment.

As events occur (such as user input), the desktop environment is processed in a manner that is appropriate given the event, resulting in perhaps some change to the state of the desktop environment. Conventionally, such desktop processing occurs on the client. However, desktop virtualization involves the offloading of the desktop processing to a location other than the client (hereinafter referred to as a "centralized desktop location"), which location is perhaps even remote from the client. That offloaded location may be a server, a server cluster, or a server cloud.

The centralized desktop location maintains a virtual machine for each supported desktop environment. The virtual machine has access to all of the desktop state necessary to construct an image for how the desktop environment should appear. The virtual machine also manages the processing that serves up desktop images to the corresponding client, which are rendered by the client as they are received.

As the client interacts with the displayed desktop image, that client input is transmitted to the centralized desktop location. The corresponding virtual machine at the centralized desktop location interprets the client input, and processes the desktop. In response to this input, or in response to some other detected event, the virtual machine changes the state of the desktop if appropriate. If this changed state results in a change in how the desktop appears, the virtual machine constructs a different desktop image, and causes the centralized desktop location to transmit the altered desktop image to the client. From the user's perspective, this occurs often fast enough that the displayed desktop at the client is substantially immediately responsive to the user input at the client. The desktop as is exists on the centralized desktop location is often referred to as a "virtual desktop", and the application-level logic on the centralized desktop that is used to process the desktop is often referred to a "virtual machine".

Typically, the centralized desktop location may manage a number of virtual desktops for a corresponding number of clients. In some cases, the centralized desktop location may manage hundreds of virtual desktops. In some cases, the centralized desktop location is a physical machine, which is referred to herein as a "physical appliance". The physical appliance provides software and data support (hereinafter referred to as the "support resources") to the virtual machine (s). For instance, the operating system and certain applications may be provided by the physical appliance. Supporting data may also be included within the support resources. For instance, user data (such as persistent preference information) may also be stored by the physical appliance.

All of the software and data support resources are conventionally located on the physical machine itself. An alternative conventional solution occurs when an organization has multiple physical appliances. To provide backup, the organization will provide access to a storage area network (SAN) to multiple physical appliances, and store the software and data support resources on the SAN. If a failure were to occur with a physical appliance, the support resources are still available on the SAN from the other physical appliance. Thus, an instance of the physical machine may be constructed on the other physical appliance, and mapped to the corresponding software and data storage resources on the SAN, thereby effecting recovery.

BRIEF SUMMARY

At least one embodiment described herein relates to the migration of a pool of virtual machines from a source physical support environment to a target physical support environment. The source physical support environment operates a pool of virtual machines. The virtual machines were all provisioned into an initial state using a master image. Thereafter, at least some user changes to the state were reflected in corresponding user delta collections for each of the virtual machines.

In preparation for the migration to the target physical support environment, a pool is allocated on the target physical support environment. This allocation may be performed before the migration is determined to occur in a pre-allocation embodiment, or may be performed after the migration is determined to occur in a dynamic pool allocation embodiment. The target pool is associated with the same master image as the source pool. Further, as part of migration, the virtual machines in the source pool may be disconnected from the user delta collections to avoid corruption of the user delta collections. The virtual machines are provisioned within the target pool based on the master image. The virtual machines in the target pool are then connected to the corresponding user delta collection, allowing the virtual machines to continue in the same state in the target physical support environment as when they operated in while last operating in the source pool in the source physical support environment.

In some embodiments, this migration may occur from multiple source physical support environments into a single target physical support environment, allowing the target to act as a master service provider. This may be accomplished even if the master service provider does not have enough processing power to run virtual machines from all served source physical support environments simultaneously.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4C illustrates a state of the network environment after the target virtual machines are provisioned;

FIG. 4D illustrates a state of the network environment after the user delta collections are unlocked to the corresponding target virtual machines;

FIG. 10 illustrates a more complex network environment in which a target physical support environment serves as a migration backup support for a number of source physical support environments.

DETAILED DESCRIPTION

In accordance with at least one embodiment described herein, migration of a pool of virtual machines to a target physical support environment is described. The virtual machines were all provisioned into an initial state using a master image. Thereafter, at least some user changes to the state were reflected in corresponding user delta collections for each of the virtual machines. In preparation for the migration to the target physical support environment, a pool is allocated on the target physical support environment. The target pool is associated with the same master image as the source pool. The virtual machines are provisioned within the target pool based on the master image. The virtual machines in the target pool are then connected to the corresponding user delta collection, allowing the virtual machines to continue in the same state in the target physical support environment as when they operated in while last operating in the source physical support environment. The target physical support environment may be as master service provider. First, some introductory discussion regarding computing systems will be described with respect to FIG. 1. Then, embodiments of the migration will be described with respect to FIGS. 2 through 10.

Figure 1:
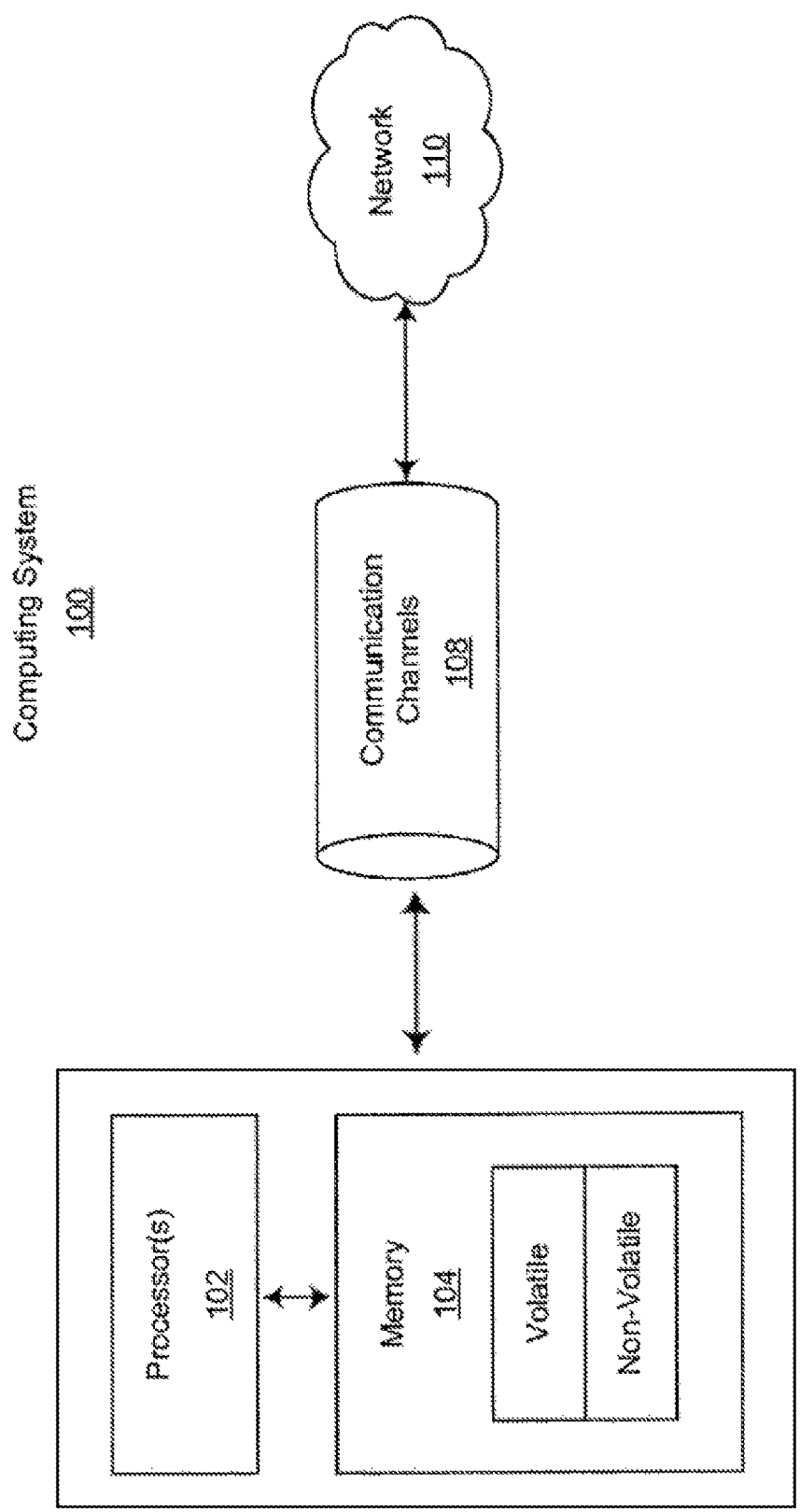
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
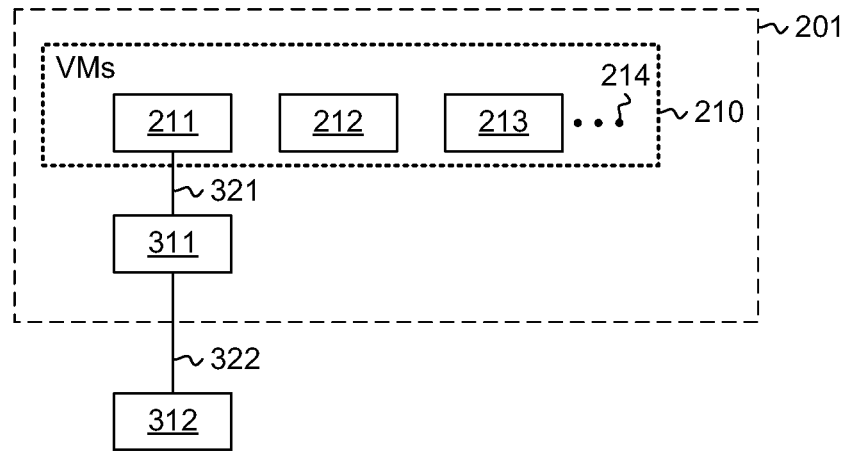
FIG. 2 illustrates a virtual machine environment that includes a single physical support environment supporting multiple virtual machines.

FIG. 2 illustrates a virtual machine operation environment 200. The operation environment includes a physical support environment 201 in which a set of virtual machines 210 operate. The physical support environment 201 may be, for example, the computing system 100 of FIG. 1, or any other device, system, or combination thereof that is capable of providing physical resources to assist in the operation of virtual machines.

There may be any number of virtual machines 210 operating in the physical support environment 201. In FIG. 2, there are three virtual machines 211, 212 and 213 shown, with ellipses 214 representing that the number of virtual machines 210 may be as few as one, but potentially as many thousands, or even more. Thus, the physical support environment 201 may be a centralized location that manages many virtual machines. Each virtual machine manages state (e.g., a desktop state) for a corresponding client that may perhaps be remotely located. The virtual machine provides an image representing a desktop image to the corresponding client, and alters the image or other desktop state in response to detected events, such as, for example, a user interfacing with the current desktop image.

As the client interacts with the displayed desktop image corresponding to a virtual machine, that client input is transmitted to the centralized environment 201. The corresponding virtual machine interprets the client input, and processes the client input. In response to this input, or in response to some other detected event, the virtual machine changes the state of the virtual desktop if appropriate. If this changed state results in a change in how the desktop appears, the virtual machine constructs and transmits another desktop image to the client. From the user's perspective, this occurs often fast enough that the displayed desktop is substantially immediately responsive to the user input.

Each virtual machine needs resources in order to operate properly. The physical support environment 201 provides a variety of support resources for each of the virtual machines 210. For instance, some of that support includes hard (physical) support resources such as processing resources, memory resources, storage resources, network access resources, and the like. However, each virtual machine also uses soft support resources, such as software and data. As far as software, the virtual machine may use an operating system, one or more applications, and/or one or more other software modules. As far as data, the physical support environment 201 may host some or all of data that is used by the virtual machine in order to operate, such as user preference data, and other application state. The "soft" support resources are so named because the resources (such as software and data) are capable of being copied from one location to another, or accessed remotely over a network.

Figure 3:
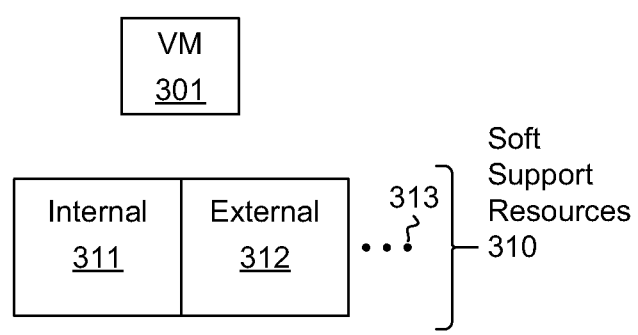
FIG. 3 illustrates a virtual machine in conjunction with internal and external soft support resources.

Referring to FIG. 3, an environment 300 is shown in which a virtual machine 301 is shown in conjunction with its soft support resources 310. The soft support resources 310 include a first portion 311, and a second portion 312. The ellipses 313 represent that there may be other portions of the soft support resources 310 as well. In accordance with the principles described herein, for each of at least some of the virtual machines operating in the physical support environment 201, a portion of the soft support resources are "internal" soft support resources in the sense that they are provided by the physical support environment 201, and a portion of the soft support resources are "external" in the sense that they are provided from a location that is external to the physical support environment.

For instance, referring to FIG. 2, the virtual machine 211 is illustrated as having a first soft support resource 311 that is internal to the physical support environment 201, and a second soft support resource 312 that is external to the physical support environment 201. In accordance with the embodiments described herein, the allocation of soft resources is made in a way that improves performance of the virtual machine, and which also allows for efficient migration of the virtual machine from one physical support environment to another.

Figure 4A:
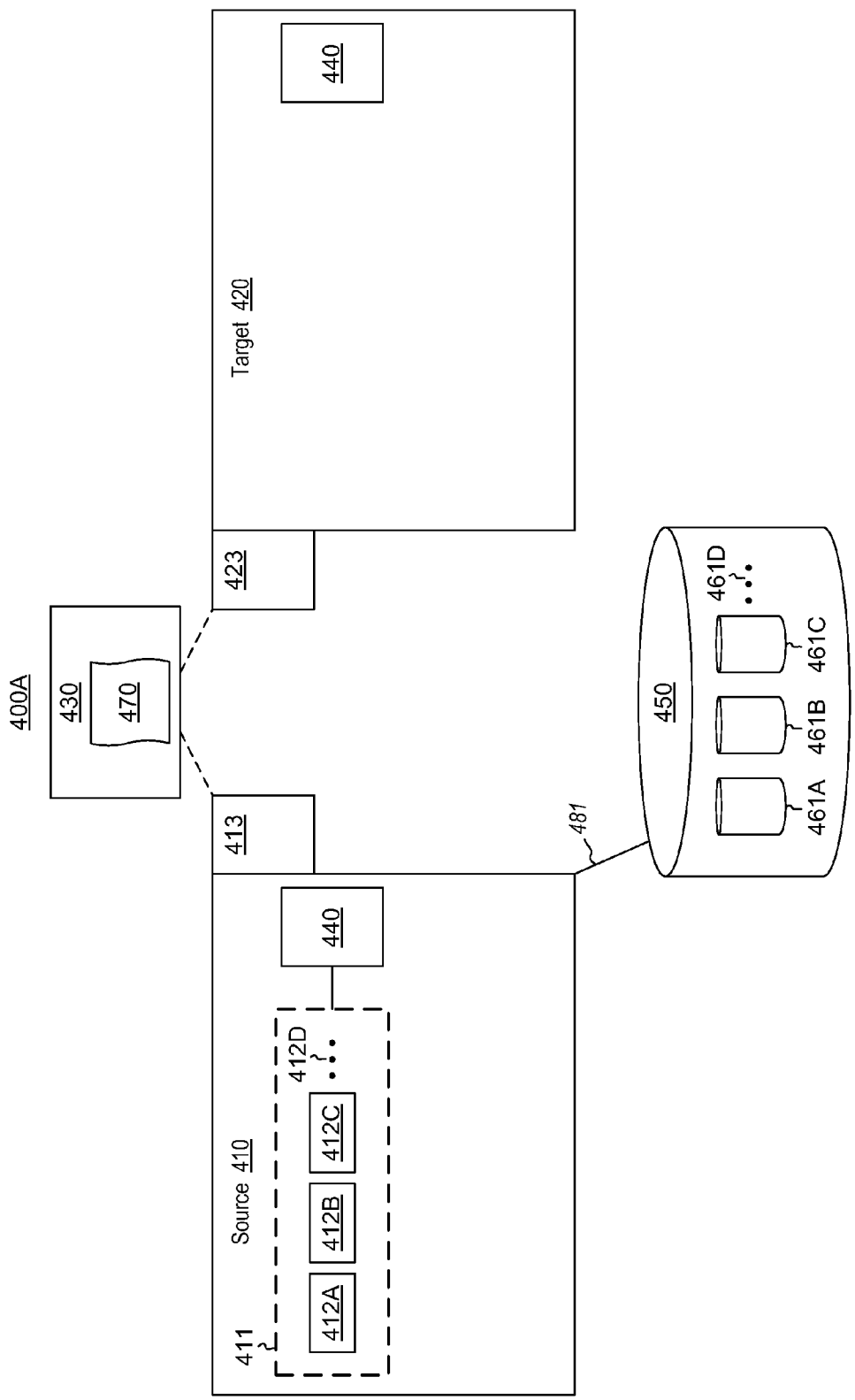
FIG. 4A illustrates an initial state of a network environment in the case of a dynamic allocation embodiment in which the target pool is not allocated until after a decision on migration.
Figure 4B:
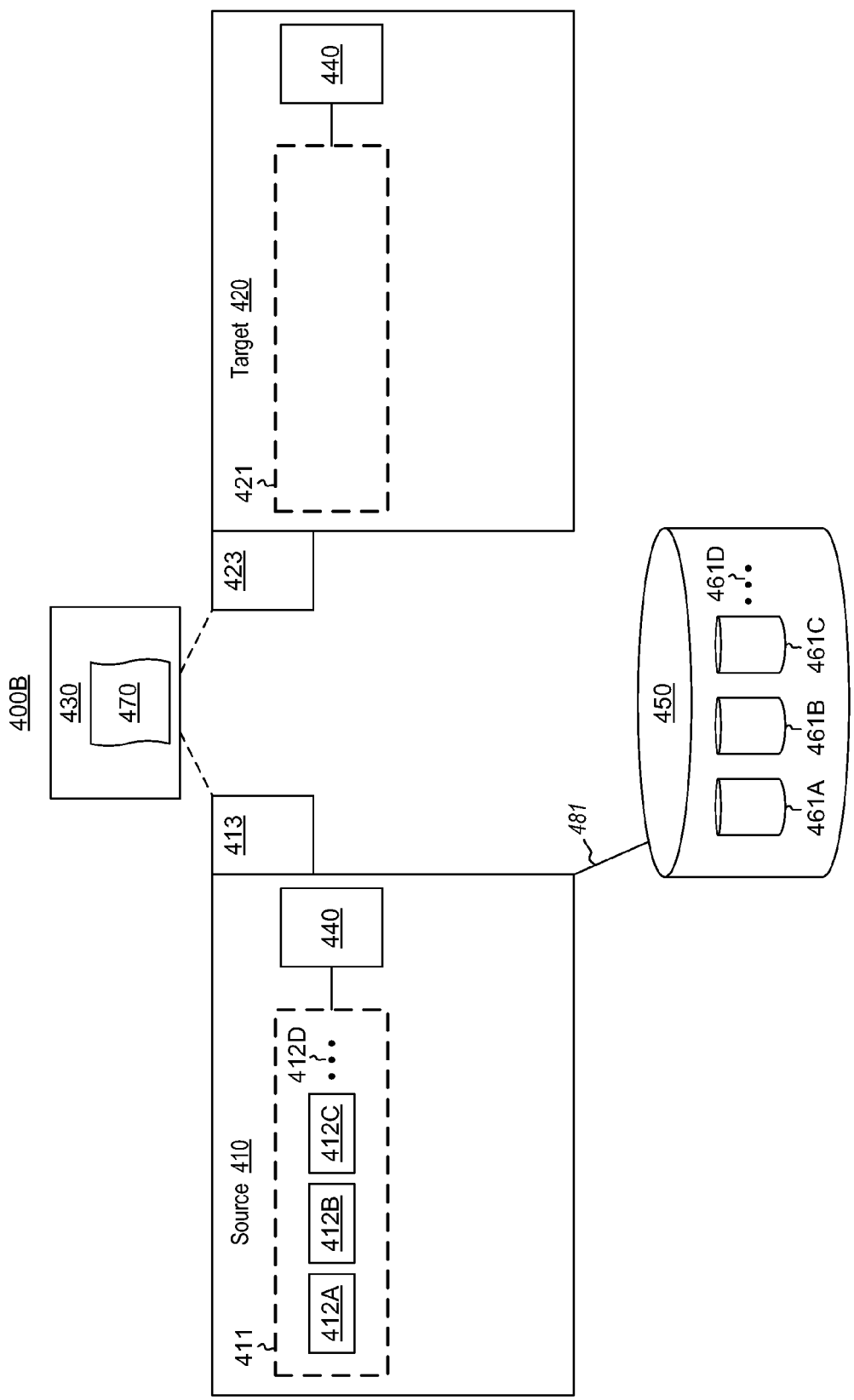
FIG. 4B illustrates a state of the network environment in the case of a dynamic allocation embodiment in which the target pool is allocated and associated with the master image, or shows an initial state of the network environment in the case of a pre-allocation embodiment in which the target pool is already established at the time of the migration decision.

The principles described herein relate to the migration of a pool of virtual machines from a source physical support environment to a target physical support environment. FIG. 4A illustrates a network environment 400A that includes a source physical support environment 410 and a target physical support environment 420. FIGS. 4B through 4D describe different states of this network environment 400A. However, for now, the network environment 400A of FIG. 4A will be described in further detail.

The source physical support environment 410 includes a pool 411 that contains a number of virtual machines 412A, 412B and 412C. The ellipses 412D represent that there may be any number of virtual machines operating within the pool 411. For instance, there may be tens, hundreds, or even thousands of virtual machines running in the pool. Hereinafter, the virtual machines 412A, 412B, 412C and 412D may be referred to hereinafter collectively as "virtual machines 412". Furthermore, the term "source" may be used to modify elements that operate within the source physical support environment 410. Thus, the virtual machines 412 may also be referred to as "source virtual machines 412". Likewise, the pool 411 may also be referred to as a "source pool 411".

The source physical support environment 410 is modified by the term "source" because in this example, the environment 410 is the source of the migration. However, that is not to say that the source physical support environment 410 might not be a target of migration in other contexts. The physical support environment 420 is also provided, and is a target for the migration of the source virtual machines 412 in this example. Accordingly, for purposes of this example, the physical support environment 420 is modified with the term "target". Furthermore, throughout this description, elements that operate within the target physical support environment 420 may also be modified with the term "target".

The source physical support environment 410 includes a monitoring agent 413 that monitors the performance of the source physical support environment 410, and reports to the migration decision agent 430. The target physical support environment 420 includes a communication agent 423 that permits communication with a migration decision agent 430. The communication agent 423 may also serve as a monitoring agent and report regarding performance of the target physical support environment to the migration decision agent 430.

The migration decision agent 430 determines whether to migrate the source virtual machines 412 to the target physical support environment 420 based on reports from the monitoring agent 413. If the migration decision agent 430 determines that a migration is to occur, the migration decision agent 430 notifies the target physical support environment 420 via the communication agent 423. In one embodiment, the communication agent 423 may also monitor performance of the target physical support environment 420.

The source pool 410 is associated with a master image 440 from which each of the source virtual machines 412 is initially provisioned into an initial state. A pool is a pool that is capable of instantiating multiple virtual machines and provisioning those pools in a common initial state using a master image. The target physical support environment 420 also includes a copy of the master image 440. The migration decision agent 430 contains pool information 470 that may be used to allocate a target pool on the target physical support environment 420. Alternatively, the pool information 470 may be located elsewhere or distributed across multiple components.

The source physical support environment 410 and the target physical support environment have shared storage 450. The shared storage 450 may be a single storage device, or may be multiple storage devices in the case of a Storage Area Network. The shared storage may also be multiple storage devices located in a large area network in which case data may be replicated across storage nodes in that large area network. Regardless, with respect to the user delta collections 461 described further herein, both the source physical support environment 410 and the target physical support environment 420 have access to the user delta collections 461. The master image 440 may likewise be at least partially stored within the shared storage 450 although not required.

The shared storage 450 includes a user delta collection corresponding to each of the source virtual machines 412. For instance, user delta collection 461A corresponds to source virtual machine 412A, user delta collection 461B corresponds to source virtual machine 412B, user delta collection 461C corresponds to source virtual machine 412C, and so forth as represented by ellipses 461D for other source virtual machines as represented by ellipses 412D. The user delta collections 461A, 461B, 461C and 461D may collectively be referred to hereinafter as "user delta collections 461".

Each user delta collection captures perhaps all, but at least some, changes to state of the corresponding source virtual machine made by the user since the corresponding source virtual machine was initially provisioned within the source pool 411. When the source virtual machines 412 are operating within the source physical support environment 410, the corresponding user delta collections are exclusively available to the corresponding source virtual machine, and locked to other components. This exclusive lock is represented collectively for all source virtual machines by connection 481. The user delta collections represent examples of the external soft support resources described above with respect to FIG. 3, as the user delta collections are not kept on the source physical support environment 410, but rather are kept externally in the shared storage 450. As an example, the user delta collections may each be the corresponding user data disk associated with their corresponding source virtual machine.

The setting up of the source virtual machines 412 into the source physical support environment 410 will now be described with respect to FIG. 5, whereas the operation of the source virtual machines 412 will be described with respect to FIG. 6. Thereafter, embodiments of the migration operation will be described with respect to FIGS. 7 through 10.

Figure 5:
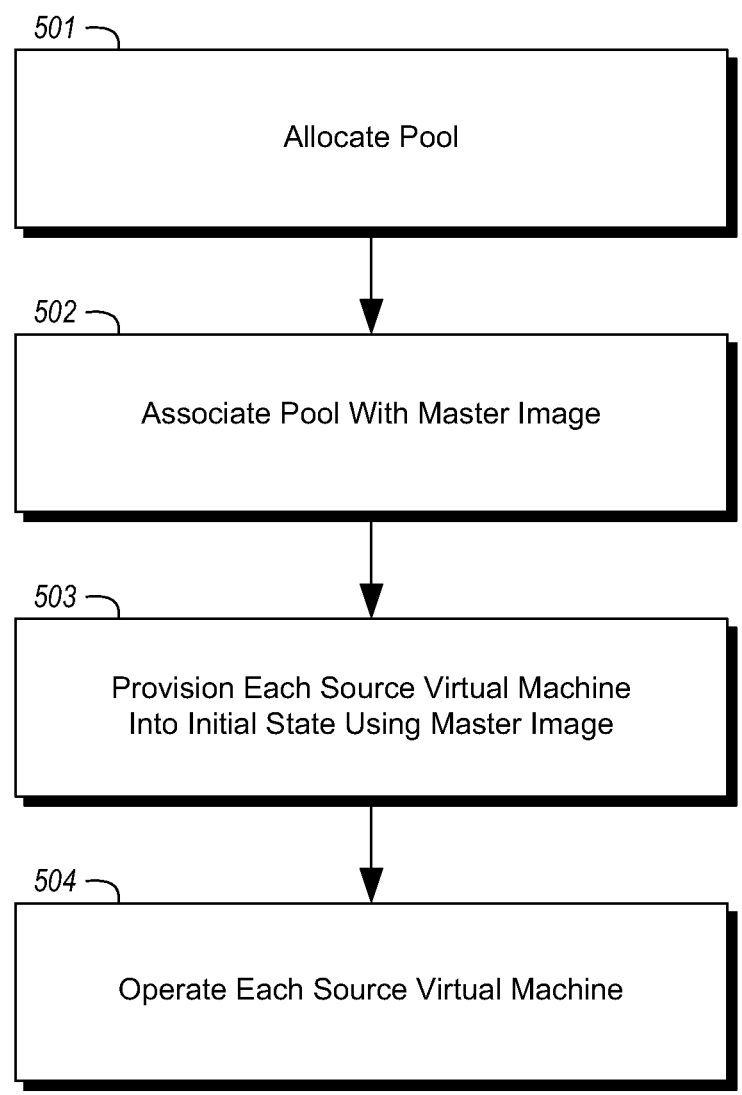
FIG. 5 illustrates a flowchart of a method for setting up the source virtual machines at the source physical support environment.

FIG. 5 illustrates a flowchart of a method 500 for setting up the source virtual machines at the source physical support environment 410. The method 500 will be described with frequent reference to the network environment 400A of FIG. 4A.

Initially, the source pool is allocated (act 501) on the source physical support environment. Referring to FIG. 4A, the source pool 411 is allocated on the source physical support environment 410. This allocation involves instantiating an instance of a pool and configuring the pool. For instance, resources may be made available to the pool, and a number of supportable virtual machines may be identified.

For instance, the pool may be configured to operate up to a certain number (e.g., perhaps 100) of virtual machines.

The source pool is associated with a master image (act 502). For instance, in FIG. 4A, the source pool 411 is associated with the master image 440.

Then, the source virtual machines are each provisioned with the master image (act 503). This provisioning involves instantiating the virtual machine, and setting the virtual machine into an initial state using the master image. In FIG. 4A, for example, the source virtual machines 412 are each provisioned using the master image 440 associated with the source pool 411. Each source virtual machine may then operate (act 504) for instance in the manner described with respect to FIGS. 2 and 3.

Figure 6:
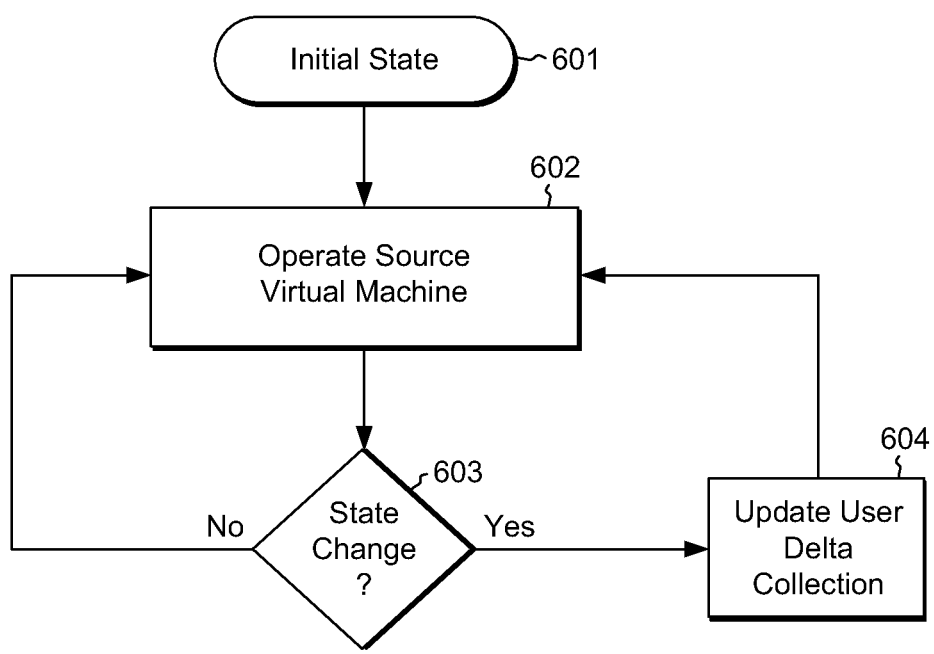
FIG. 6 illustrates a flowchart of a method for operating a source virtual machine after the virtual machine is provisioned in the source physical support environment.

FIG. 6 illustrates a flowchart of a method 600 for operating a source virtual machine after the virtual machine is provisioned in the source physical support environment. For instance, the method 600 may be performed independently for each source virtual machine 412 in the source pool to generate a different state represented in the corresponding user delta collection.

Each source virtual machine initially begins operation in the initial state (act 601) since they were each provisioned into that initial state. Then, as the source virtual machine continues operation (act 602), if there is not a state change caused by the user (No in decision block 603), then the source virtual machine continues operation (act 602) without updating the corresponding user delta collection. However, as the source virtual machine operates (act 602), the user may cause a change in the virtual machine state ("Yes" in decision block 603). In at least some, and perhaps all, of those occasions, the corresponding user delta collection is updated (act 604). For instance, in the case of a change in state of source virtual machine 412A, the user delta collection 461A is updated. In the case of a change in state of source virtual machine 412B, the user delta collection 461B is updated, and so forth for all other source virtual machines.

Figure 7:
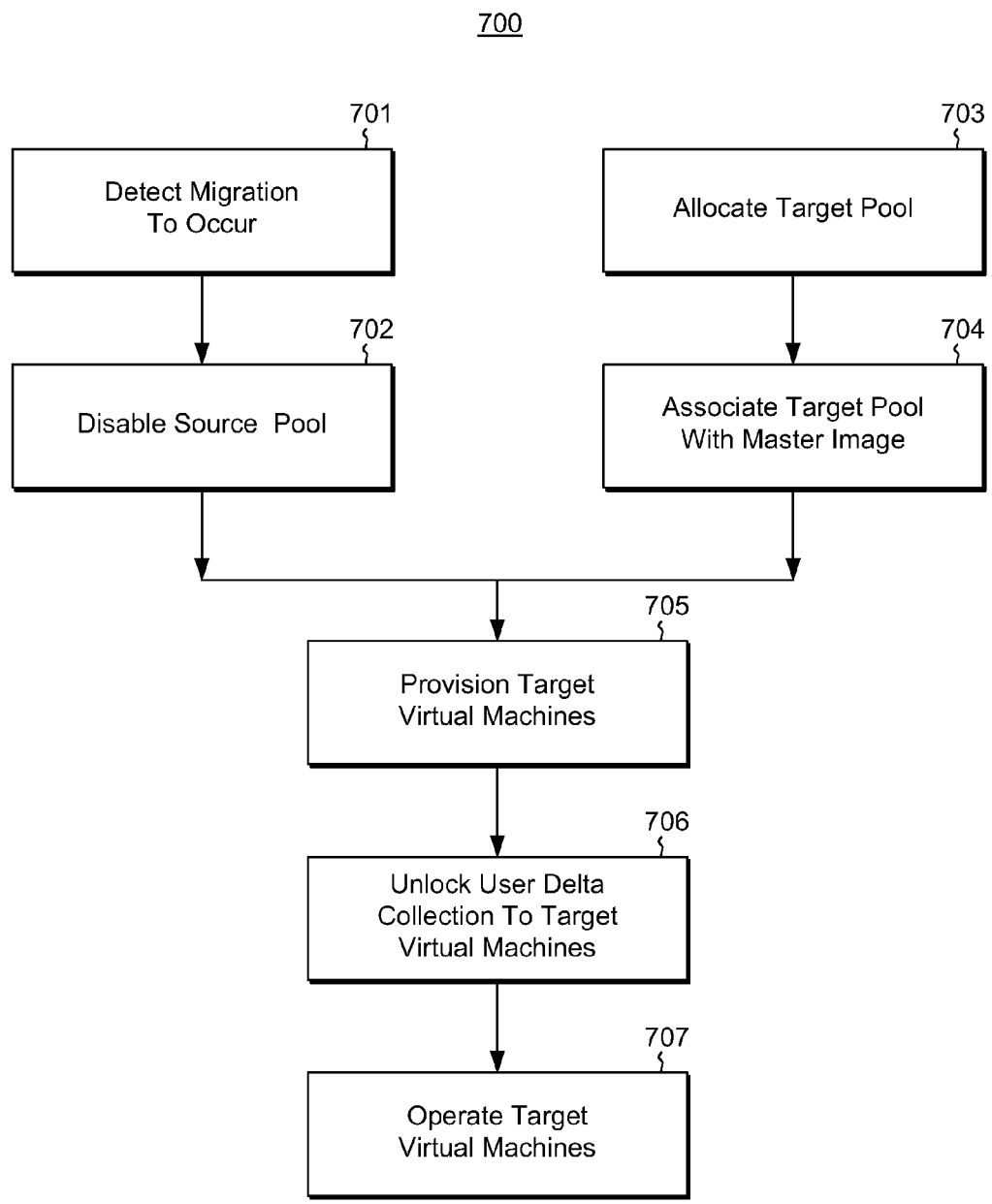
FIG. 7 illustrates a flowchart of a method for migrating source virtual machines from a source physical support environment to a target physical support environment.

At some point, there may be a decision to migrate the source virtual machines 412 from the source physical support environment 410 to the target physical support environment. FIG. 7 illustrates a flowchart of a method 700 for migrating source virtual machines from a source physical support environment to a target physical support environment.

The method 700 includes detecting that source virtual machines that operate in a source physical support environment are to be migrated from the source physical support environment (act 701). In the embodiment of FIG. 4A, this detection is made by migration decision agent 430, which determines whether or not to migrate based on information received from the monitoring agent 413. If migration is to occur, the migration decision agent 430 informs the communication agent 423 of the same. The decision may be based on, for example, deterioration of performance or perhaps even cessation of all operation of the source physical support environment 410. In some embodiments, there may be multiple potential target physical support environments capable of serving as a target of the migration. For instance, there may be multiple target physical support environments that have access to the master image 440 and either pool information 470 or an already instantiated target pool. In that case, the migration decision agent 430 may also decide which target physical support environment is to serve as the target of the migration.

Upon deciding that migration is to occur (act 701), source pool is disabled (act 702). This disabling causes each of the source virtual machines to no longer have access to the corresponding user delta collection. Referring to FIG. 4A, the connection 481 would be removed. This prevents the user delta collections from being corrupted during the migration operation. For instance, should the status of the source physical support environment improve during the migration operation, the source virtual machines are nevertheless prevented from accessing the user delta collections. After all, once the migration is completed, virtual machines on the target physical support environment would also access the same user delta collection. Such dual access to the user delta collection risks corruption of the user delta collection.

To facilitate migration, the target physical support environment allocates a target pool (act 703) on a target physical support environment. FIG. 4B illustrates a state 400B of the network environment of FIG. 4A after the target pool 421 is established. Referring to FIG. 4B, a target pool 421 is allocated within the target physical support environment 420. The target pool 421 is associated (act 704) with the master image 440. In some embodiments (called herein "matching pool embodiments"), the target pool 421 matches the source pool 411.

In other embodiments (called herein "non-matching pool embodiments"), the target pool 421 does not match the source pool 411. For instance, the pools may be non-matching in the sense that the number of virtual machines they support may be different. As a first example, perhaps the target pool 421 is large enough and has enough resources to serve as a target for migration of several source pools including the source pool 411. As a second example, perhaps the source pool 411 is larger than the target pool 421 such that the source virtual machines from the source pool 411 are divided amongst several target pools including the target pool.

As another example of non-matching pools, the pools might be non-matching in the sense that they assign slightly different virtualized hardware to the virtual machine. As a first example, perhaps source virtual machine 412A runs a virtualized processor of one type as assigned by the source pool 411, and target virtual machine 422A runs a virtualized processor of a different type as assigned by the target pool 412. As a second example, perhaps source virtual machine 412A has more or less Random Access Memory (RAM) as assigned by the source pool 411 as compared to the RAM assigned to the target virtual machine 422A as assigned by the target pool 421. In this latter example, the difference may be caused by an administrator setting policy The establishment of the target pool (acts 703 and 704) are shown in parallel with the migration decision (act 701) because the target pool may be established before or after the migration.

For instance, in a dynamic allocation embodiment, the target pool is established (acts 703 and 704) after the decision to migrate (act 701). In that case, prior to migration, when the source virtual machines 412 are still operating within the source physical support environment 410, the migration decision agent 430 uses the pool information 470 to establish the target pool 421 of FIG. 4B. In that case, the decision to migrate occurs while the network environment has the state 400A of FIG. 4A.

On the other hand, in a pre-allocation embodiment, the target pool is established (acts 703 and 704) before the decision to migrate (act 701). In that case, the decision to migrate occurs while the network environment has the state 400B of FIG. 4B. Regardless, once the decision to migrate has occurred (act 701), and the target pool has been established (acts 703 and 704), the state 400B of FIG. 4B has been achieved.

The target virtual machines are then provisioned (act 705). FIG. 4C illustrates a state 400C of the network environment after the target virtual machines have been provisioned. The target virtual machines 422A, 422B, 422C were provisioned within the target pool 421 using the master image 440. Each of the target virtual machines 422 corresponds to a respective one of the source virtual machines 412. For instance, target virtual machine 422A corresponds to source virtual machine 412A, target virtual machine 422B corresponds to source virtual machine 412B, target virtual machine 422C corresponds to source virtual machine 412C, and so forth as represented by ellipses 422D for additional virtual machines if there are other source virtual machines as represented by ellipses 412D.

Migration of source virtual machine 412A to target physical support environment occurs by instantiating a corresponding target virtual machine 422A, placing that virtual machine 422A in the same state as the source virtual machine 412A was at the time of migration, and making that new target virtual machine 422A available to the user of the source virtual machine 412A. From the user's perspective, the migration may even be transparent. The migration decision agent 430 may even be a connection broker that channels client communications that previously went to the source virtual machine 412A instead to the target virtual machine 422A. The same may be said of target virtual machine 422B with respect to the corresponding source virtual machine 412B, and the target virtual machine 422C with respect to the corresponding source virtual machine 412C.

However, referring to the state 400C of FIG. 4C, the target virtual machines are only at this point provisioned into an initial state based on the master image (act 705). Note also the presence of a cross-out marker 490 that indicates at this point that the source pool 411 is now disabled. The act of provisioning (act 705) may be performed by configuring the target pool 421 such that when the target pool 421 is enabled, the corresponding target virtual machines are automatically provisioned.

Referring to FIG. 7, once the target virtual machines are provisioned, the corresponding user delta collections are unlocked to the corresponding virtual machine (act 706) such that the corresponding user delta collection is made accessible. FIG. 4D illustrates a state 400D of the network connection after the user delta collections 461 have been unlocked to the target virtual machines 422 as represented by the connection 482. For instance, target virtual machine 422A now has access to the user delta collection 461A, and thus now has the same state as the source virtual machine 412A had at the time of the migration. Similarly, target virtual machine 422B now has access to the user delta collection 461B, and thus now has the same state as the source virtual machine 412B had at the time of the migration. Finally, target virtual machine 422C now has access to the user delta collection 461B, and thus now has the same state as the source virtual machine 412B had at the time of the migration.

With the target virtual machines 422 now having the same state just after the migration, as the source virtual machines 412 had just prior to the migration, the target virtual machines 422 may continue operating (act 707) in the manner described with respect to FIG. 6 by continuing to make changes to the respective user delta collection, and interacting with the client.

When the target pool 421 is established, it may be made to match the source pool 411 as in the case of the matching pool embodiments. In this sense, "match" means one of more of the following: 1) the target pool has the same hardware resources as the source pool, 2) the target pool has the same operating system as the source pool, 3) the target pool has the same configuration as the source pool, and/or 4) the target pool has the same number of virtual machines allocated in the target pool as there were allocated in the source pool. The pool information 470 may contain sufficient information regarding the source pool 411 to allow the target physical support system 420 to set up such a matching target pool 421.

FIGS. 4A through 4D illustrated a circumstance in which a single pool is migrated from a source physical support environment to a target physical support environment using a single application of the method 700 of FIG. 7. However, the method 700 may be performed multiple times to facilitate multiple migration operation of multiple pools.

Figure 8:
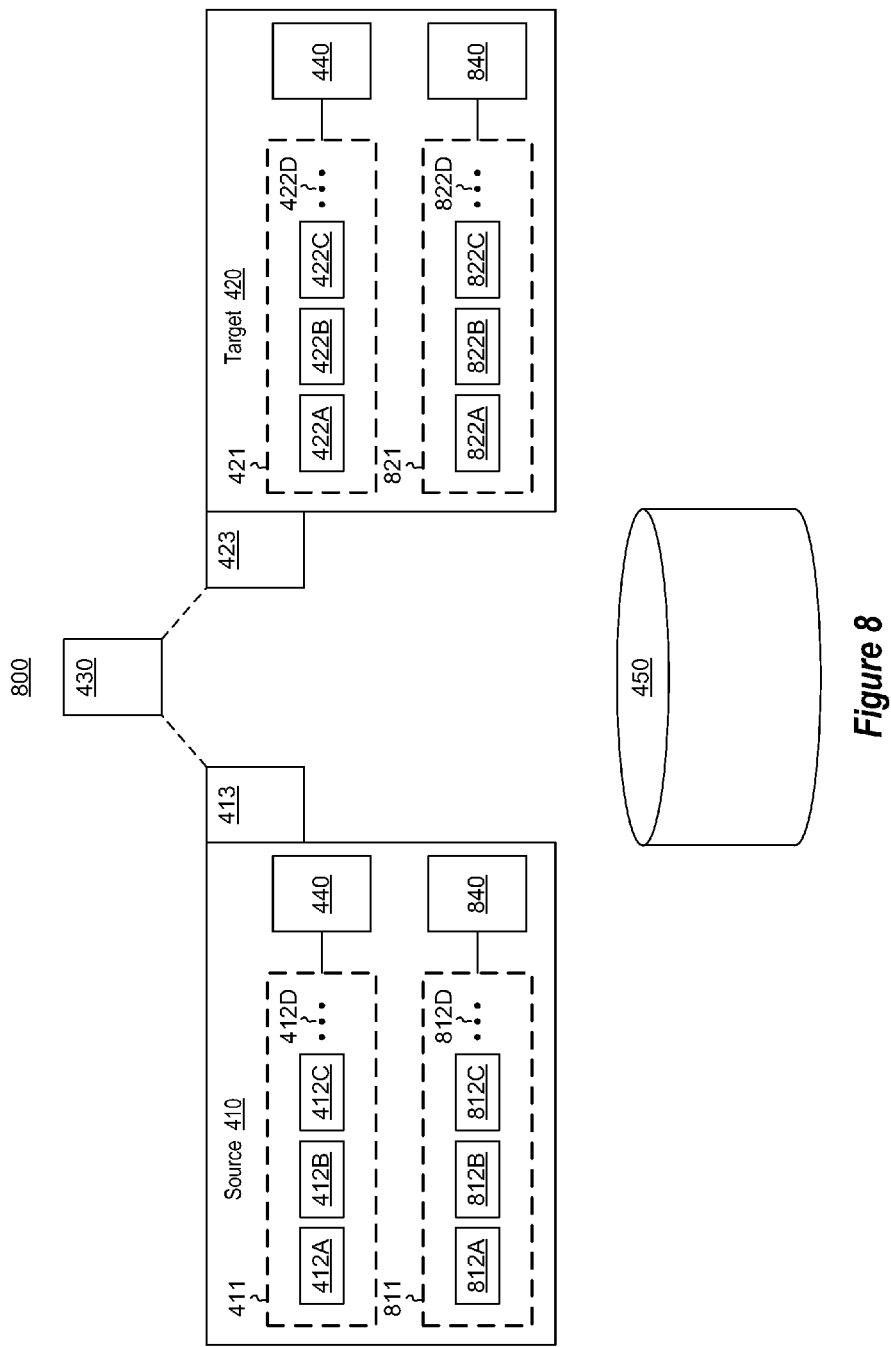
FIG. 8 illustrates a network environment in which two source pools are migrated from a single source physical support environment to a single target physical support environment.

For instance, FIG. 8 illustrates a network environment 800 that is similar to the network environment of FIGS. 4A through 4D in that the method 700 is applied to cause source pool 411 (having master image 440) having source virtual machines 412 to be migrated from the source physical support environment 410 to the target physical support environment 420 to form target pool 421 (also having master image 440) having target virtual machines 422. However, the method 700 may be applied again to migrate the source pool 811 having a different master image 840 to the target pool 821 also having the master image 840. For instance, target virtual machine 822A may be set up to have the same state as the source virtual machine 812A, target virtual machine 822B may be set up to have the same state as the source virtual machine 812B, target virtual machine 822C may be set up to have the same state as the source virtual machine 812C, and so forth as represented by ellipses 812D and 822D. In the matching pool embodiments, the target pool 421 may match the source pool 411, whereas the target pool 821 may match the source pool 811. In some non-matching pool embodiments, the target pools 421 and 821 may be a single larger target pool, and the virtual machines from each source pool 411 and 811 are consolidated into that larger target pool. In some non-matching pool embodiments, the source pools 411 and 811 may a single source pool, and a portion of the source virtual pool set may be migrated to each of the target pools 421 and 821.

Figure 9:
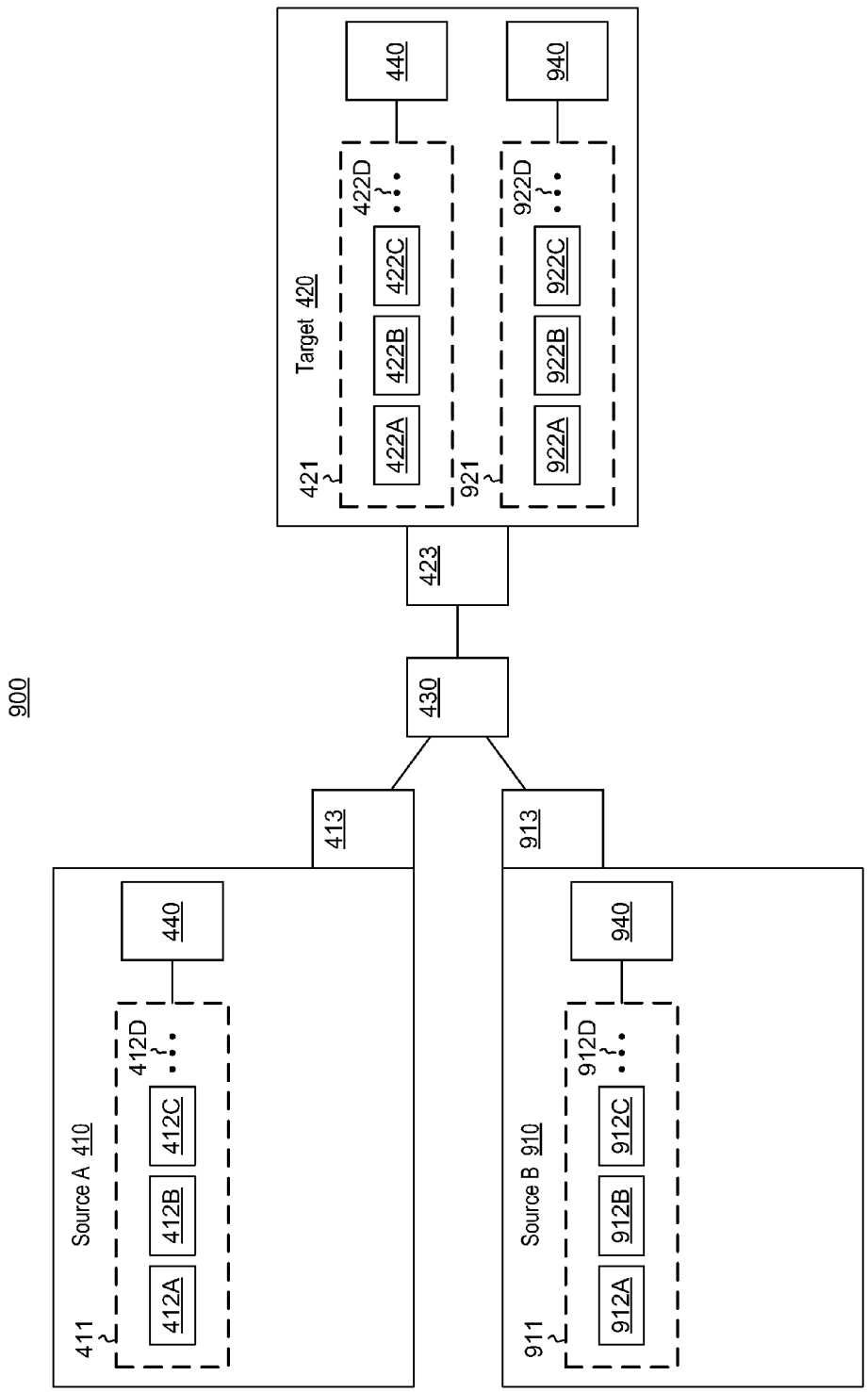
FIG. 9 illustrates a network environment in which two source pools are migrated from different source physical support environment to a single target physical support environment.

FIG. 9 illustrates a network environment 900 that is similar to the network environment of FIGS. 4A through 4D in that the method 700 is applied to cause source pool 411 (having master image 440) having source virtual machines 412 to be migrated from the source physical support environment 410 (referenced in FIG. 9 as "Source A") to the target physical support environment 420 to form target pool 421 (also having master image 440) having target virtual machines 422. However, the method 700 may be applied again to migrate the source pool 911 having a different master image 940 and on a different source physical support environment 910 (reference in FIG. 9 as "Source B") to the target pool 921 also having the master image 940 on the target physical support environment 420. For instance, target virtual machine 922A may be set up to have the same state as the source virtual machine 912A, target virtual machine 922B may be set up to have the same state as the source virtual machine 912B, target virtual machine 922C may be set up to have the same state as the source virtual machine 912C, and so forth as represented by ellipses 912D and 922D. The source physical support environment 910 has a monitoring agent 913 which notifies the migration decision agent 430 about the performance of the source physical support environment 910. In the matching pool embodiments, the target pool 421 may match the source pool 411, whereas the target pool 921 may match the source pool 911. In some non-matching pool embodiments, the target pools 421 and 921 may be a single larger target pool, and the virtual machines from each source pool 411 and 911 are consolidated into that larger target pool.

FIG. 10 illustrates a more complex network environment 1000. Here, the target physical support environment 1080 acts as a master service provider that provides migration backup services to multiple source physical support environments. The supported source physical support environments are illustrated as including five physical support environments 1001 through 1005, although the ellipses 1006 represents that the target physical support environment 1080 may serve additional physical support environments as well. For instance, the master service provider may serve as a migration backup service to hundreds, or even thousands, of source physical support environments.

The target physical support environment 1080 may support a different number of pools. For instance, the target physical support environment 1080 may support migration backup services for pools 1011 and 1012 on source 1001, pool 1021 on source 1002, pools 1031, 1032 and 1033 on source 1003, pool 1041 on source 1004, and pools 1051 and 1052 on source 1005. For each supported pool, the target physical support environment 1080 has enough storage access to be able to store each corresponding master image for each supported pool. Furthermore, the target 1080 either stores the pool information (in the dynamic allocation embodiment), or allocates a pool (in the pre-allocation embodiment) for each of the supported pools.

The supported pools are only migrated in a limited set of circumstances such as reduced performance or cessation of operation of the corresponding source. Accordingly, not all of the supported pools are going to be migrated onto the target 1080. Accordingly, the target 1080 does not need to have enough processing power to perform operate all of the virtual machines supported by each of the supported pools. For instance, perhaps the target 1080 is only capable of operating virtual machines from a limited number of pools (three in the illustrated example) at a given time. This capability is represented by elements 1091, 1092 and 1093. However, having this lesser processing capability may be well more than enough to guaranty the migration backup services for a larger number of supported pools since a limited number of the supported pools are going to actually be migrated. Furthermore, since such migration does not occur all at one time for all supported pools, there is likely suitable time to augment the target 1080 with additional processing capability if needed.

Accordingly, an efficient mechanism for migrating virtual machines from a source to a target physical support environment has been described in the context in which such virtual machines operate in a pool.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for migrating a plurality of virtual machines from a source physical support environment to a target physical support environment, the method comprising:

a) detecting that a plurality of source virtual machines that operate in a source physical support environment is to be migrated from the source physical support environment to the target physical support environment, wherein the plurality of source virtual machines each operate in a source pool in which each of the plurality of source virtual machines is initially provisioned from a master image, and further wherein each of the plurality of source virtual machines has an associated user delta collection that captures user changes to each source virtual machine state made since the corresponding source virtual machine was initially provisioned within the source pool, each user delta collection being on shared storage shared by both the source physical support environment and the target physical support environment;

b) allocating a target pool on a target physical support environment;

c) associating the target pool with the master image;

d) for each respective one of the plurality of source virtual machines, locking the associated user delta collection to prevent access to the associated user delta collection by the respective one source virtual machine;

e) after locking, provisioning a plurality of target virtual machines with the master image, each of the plurality of target virtual machines corresponding to a respective one of the plurality of source virtual machines; and f) after provisioning, unlocking each corresponding associated user delta collection associated with each of the plurality of source virtual machines such that the corresponding associated user delta collection is made accessible exclusively to the corresponding one of the plurality of target virtual machines, wherein the target pool and the source pool do not completely match with respect to virtualized hardware in that at least one of the plurality of target virtual machines and at least one of the plurality of source virtual machines have at least partially different virtualized hardware.

2. The method in accordance with claim 1, wherein the source physical support environment is a first source physical support environment, the plurality of source virtual machines is a first plurality of source virtual machines, the source pool is a first source pool, the target physical support environment is a first target physical support environment, the plurality of target virtual machines is a first plurality of target virtual machines, the target pool is a first target pool, and the master image is a first master image, the method further comprising:

a) detecting that a second plurality of source virtual machines that operate in a second source physical support environment is to be migrated from the second source physical support environment to the target physical support environment, wherein the second plurality of source virtual machines each operate in a second source pool in which each of the second plurality of source virtual machines is initially provisioned from a second master image, and further wherein each of the second plurality of source virtual machines has an associated user delta collection that captures at least some user changes to respective virtual machine state made since the corresponding virtual machine was initially provisioned within the second source pool, each user delta collection of the second plurality of source virtual machines being on shared storage shared by both the second source physical support environment and the second target physical support environment;

b) allocating a second target pool on a second target physical support environment;
c) associating the second target pool with the second master image;
d) for each respective one of the second plurality of source virtual machines, locking the associated user delta collection to prevent access to the associated user delta collection by the respective one source virtual machine of the second plurality of source virtual machines;
e) after locking each associated user delta collection associated with each of the second plurality of source virtual machines, provisioning a second plurality of target virtual machines with the second master image, each of the second plurality of target virtual machines corresponding to a respective one of the second plurality of source virtual machines; and
f) after provisioning the second plurality, unlocking each corresponding user delta collection associated with each of the second plurality of source virtual machines such that the corresponding user delta collection is made accessible exclusively to the corresponding one of the second plurality of target virtual machines.

3. The method in accordance with claim 2, wherein the first target pool and the second target pool are the same target pool.

4. The method in accordance with claim 2, wherein the first target pool and the second target pool are different target pools.

5. The method in accordance with claim 2, wherein the first source physical support environment and the second source physical support environment are on different physical machines, but the first target physical support environment and the second target physical support environment are both on a target physical machine.

6. The method in accordance with claim 5, wherein the target physical machine is a master service provider that provides migration services to a plurality of source physical support environments.

7. The method in accordance with claim 6, wherein the target physical machine has enough storage to accommodate master images for each source pool in each of the plurality of source physical support environments, but does not have enough processing power to operate a corresponding target pool for all of the source pools simultaneously.

8. The method in accordance with claim 1, wherein detecting that the plurality of source virtual machines that operate in the source physical support environment is to be migrated from the source physical support environment further comprises:
a) determining that performance of the source physical support environment has at least deteriorated.

9. The method in accordance with claim 1, further comprising prior to detecting:
a) allocating the source pool on the source physical support environment;
b) associating the source pool with the master image;
c) operating the plurality of source virtual machines to thereby generate the associated user delta collection for each of the plurality of target virtual machines.

10. The method in accordance with claim 1, wherein the user delta collections are each user data disks.

11. The method in accordance with claim 1, wherein the shared storage comprises replicated storage.

12. The method in accordance with claim 1, wherein allocating the target pool occurs after detecting.

13. The method in accordance with claim 1, wherein allocating the target pool occurs before detecting.

14. The method in accordance with claim 1, wherein the plurality of source virtual machines are prevented from accessing the associated user delta collections by disabling the source pool.

15. The method in accordance with claim 14, wherein disabling occurs before provisioning.

16. The method in accordance with claim 1, wherein provisioning is accomplished by enabling the target pool.

17. The method in accordance with claim 1, further comprising:
operating the target pool by running all of the plurality of target virtual machines.

18. A computer program product comprising one or more non-transitory computer-readable media having thereon computer-executable instructions that, when executed by one or more processors of a computing system, cause the computing system to perform a method for migrating a plurality of source virtual machines to a target physical support environment, the method comprising:
a) detecting that a plurality of source virtual machines that operate in a source physical support environment is to be migrated from the source physical support environment to the target physical support environment wherein the plurality of source virtual machines each operate in a source pool in which each of the plurality of source virtual machines is initially provisioned from a master image, and further wherein each of the plurality of source virtual machines has an associated user delta collection that captures user changes to each source virtual machine state made since the corresponding source virtual machine was initially provisioned within the source pool, each user delta collection being on shared storage shared by both the source physical support environment and the target physical support environment;
b) allocating a target pool on a target physical support environment;
c) associating the target pool with the master image;
d) for each respective one of the plurality of source virtual machines, locking the associated user delta collection to prevent access to the associated user delta collection by the respective one source virtual machine;
e) after locking, provisioning a plurality of target virtual machines with the master image, each of the plurality of target virtual machines corresponding to a respective one of the plurality of source virtual machines; and
f) after provisioning, unlocking each corresponding associated user delta collection associated with each of the plurality of source virtual machines such that the corresponding associated user delta collection is made accessible exclusively to the corresponding one of the plurality of target virtual machines, wherein the target pool and the source pool do not completely match with respect to virtualized hardware in that at least one of the plurality of target virtual machines and at least one of the plurality of source virtual machines have at least partially different virtualized hardware.

19. The computer program product in accordance with claim 18, wherein the target pool is matched to the source pool.

20. The computer program product in accordance with claim 19, wherein the target pool has the same type of hardware resources as the source pool.

21. The computer program product in accordance with claim 19, wherein the target pool has the same number of virtual machines allocated in the target pool as there were allocated in the source pool.

* * * * *